United States Patent [19]

Sheehan

[11] Patent Number: 5,129,676
[45] Date of Patent: Jul. 14, 1992

[54] COUNTERBALANCED TELESCOPIC ROLLBAR FOR TRACTORS

[75] Inventor: Ronald T. Sheehan, Lancaster, Pa.

[73] Assignee: Ford New Holland, Inc., New Holland, Pa.

[21] Appl. No.: 656,922

[22] Filed: Feb. 19, 1991

[51] Int. Cl.$^5$ ............................................. B60R 21/13
[52] U.S. Cl. .................................................... 280/756
[58] Field of Search ................. 280/756, 753; 296/102; D15/33

[56] References Cited

U.S. PATENT DOCUMENTS

| | | | |
|---|---|---|---|
| 3,292,726 | 12/1966 | Jette, Jr. ........................... | 280/753 X |
| 4,148,504 | 4/1979 | Rushing ............................... | 280/756 |
| 4,158,460 | 6/1979 | White ................................... | 280/756 |
| 4,877,265 | 10/1989 | DeBraal et al. .................... | 280/756 |
| 4,949,991 | 8/1990 | Ludwig .............................. | 280/756 |

FOREIGN PATENT DOCUMENTS

| | | | |
|---|---|---|---|
| 1211640 | 11/1970 | United Kingdom ................ | 280/756 |
| 2163585 | 2/1986 | United Kingdom ................ | 280/756 |

OTHER PUBLICATIONS

Selected pages of Parts Manual for Model 2855N Orchard Tractor by Deere & Co. (Jan. 1987).
Advertising/Marketing Brochure entitled "Orchard/Vineyard and High-Clearance Tractors" dated 1988.

Primary Examiner—Charles A. Marmor
Assistant Examiner—Tamara L. Graysay
Attorney, Agent, or Firm—Frank A. Seemar; Larry W. Miller

[57] ABSTRACT

A telescopic rollover protective structure for use with an orchard tractor is disclosed wherein the protective member is operatively engaged with a counterbalancing spring to offset the weight thereof and to facilitate the movement of the protective structure between raised and lowered positions. A locking mechanism is connected to the mounting frame and engageable with the movable protective member to restrict movement thereof when the locking mechanism is engaged therewith. The counterbalancing system includes a compression spring concentrically mounted on a telescopic rod housed within the hollow protective member legs.

13 Claims, 4 Drawing Sheets

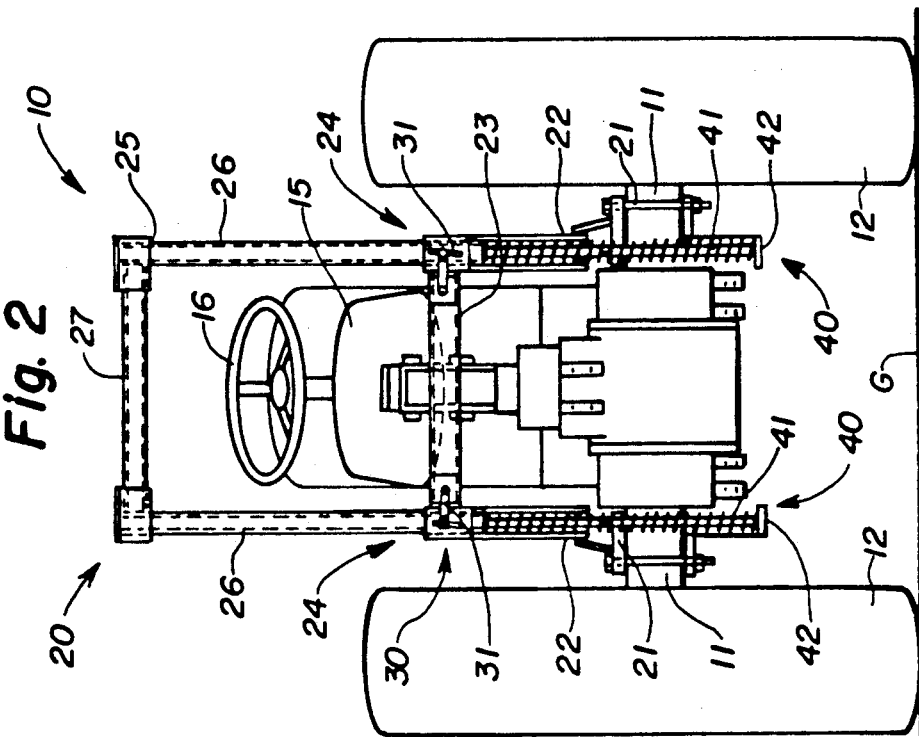
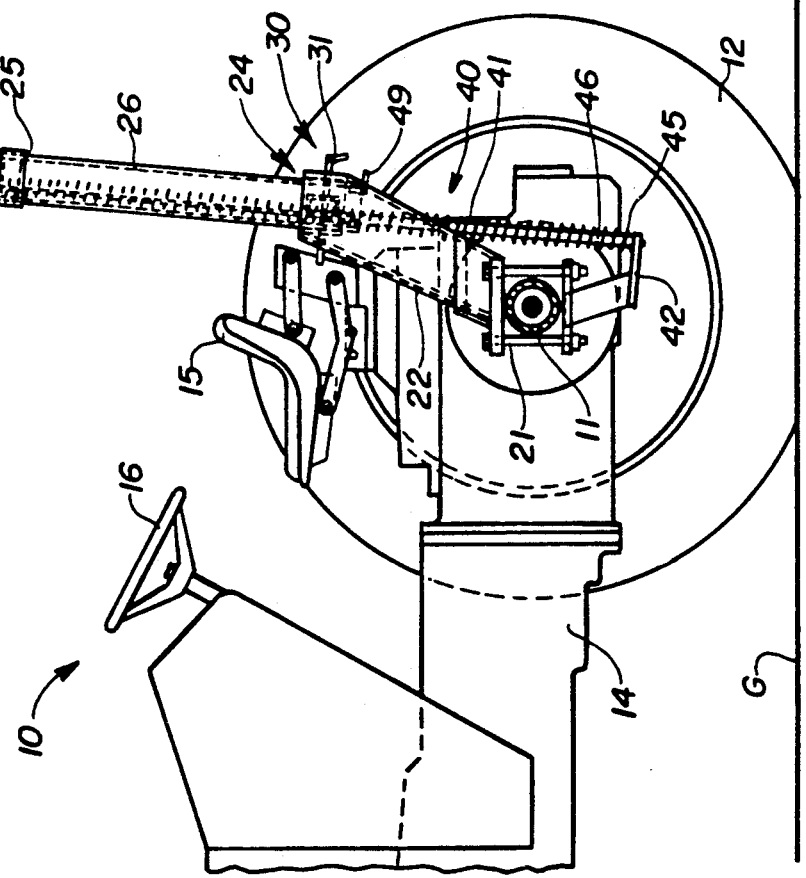

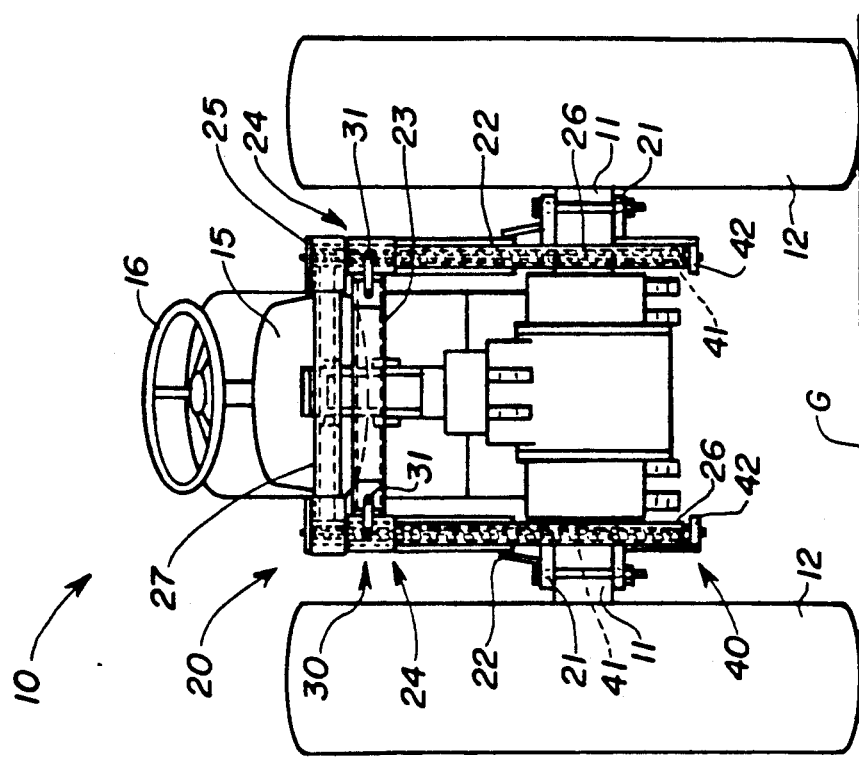
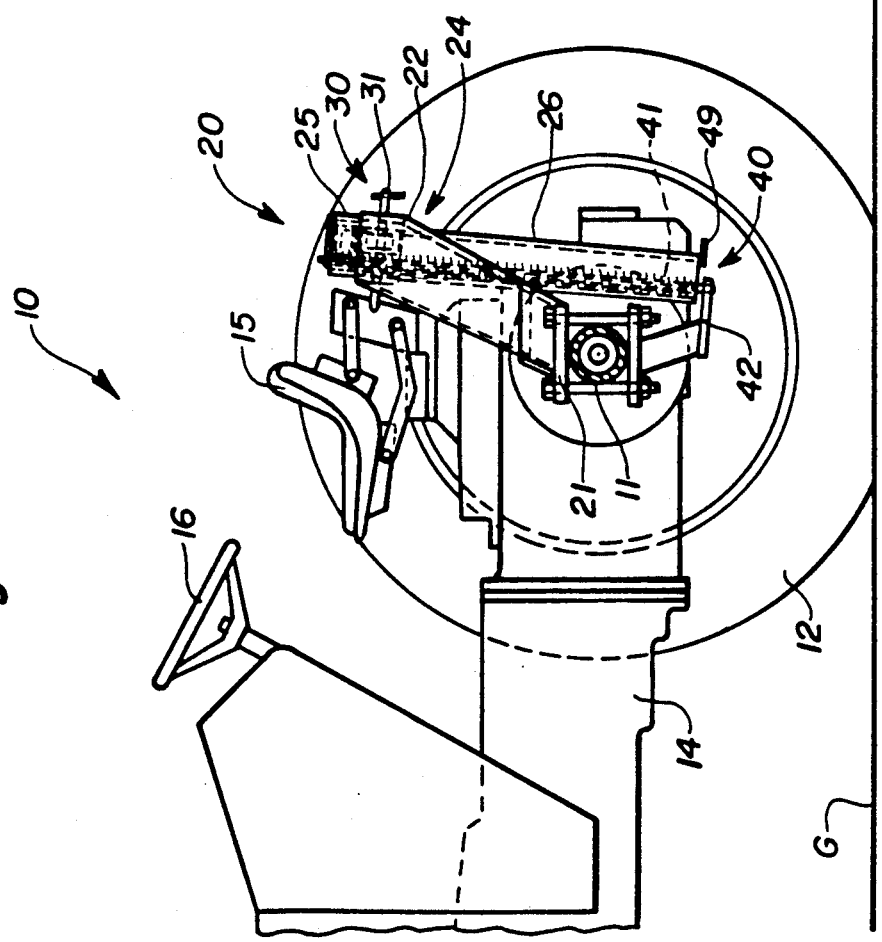

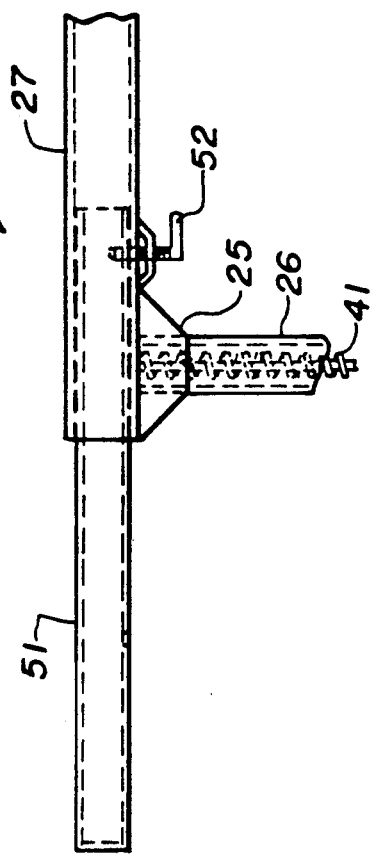
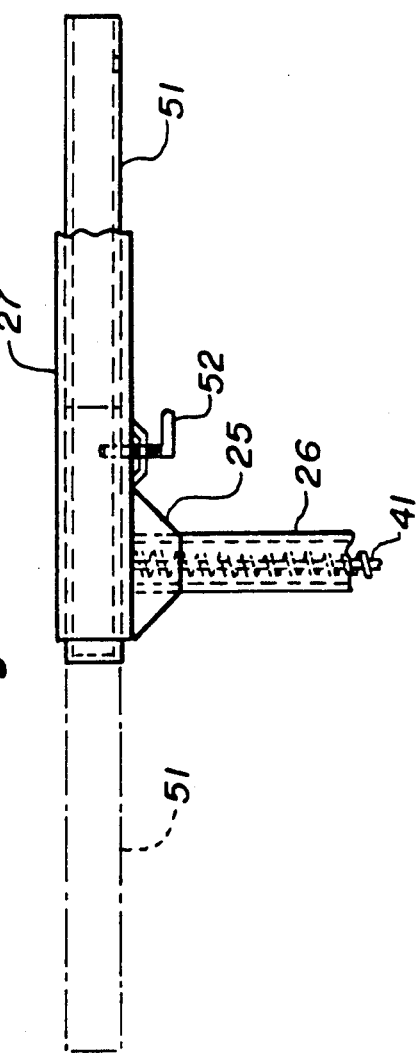
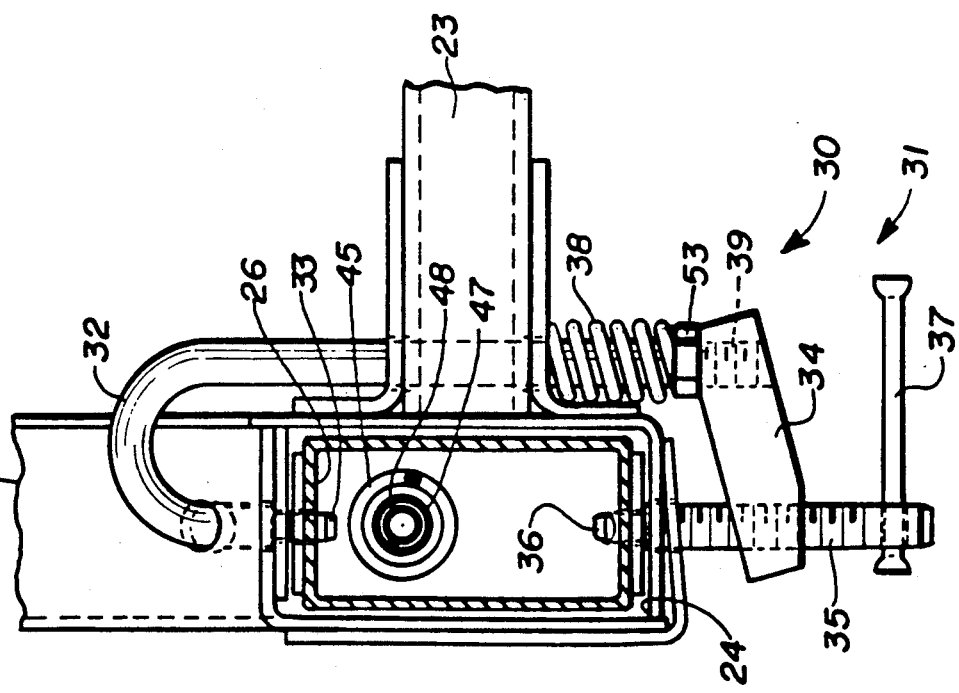

COUNTERBALANCED TELESCOPIC ROLLBAR FOR TRACTORS

BACKGROUND OF THE INVENTION

The present invention relates generally to a rollover protective structure for use with orchard tractors and, more particularly, to a telescopic or collapsible rollover protective structure that is movable between raised and lowered positions.

Fixed rollover protective structures, commonly referred to as ROPS, are provided with a structural member extending above the operator of a vehicle, such as a tractor, so that the operator can be retained, when used in cooperation with a restraint system such as a seat belt, within a protective envelope in the event the vehicle rolls over. Accordingly, fixed ROPS devices are typically the tallest structure on a tractor. In certain instances, such as when the tractor is operating in an orchard having low hanging fruit bearing tree limbs, it is desirable to remove the fixed ROPS out of interference with such obstacles. To facilitate operation of tractors in orchards, collapsible ROPS devices have been developed, such as shown in U.S. Pat. No. 4,949,991.

A telescopic ROPS has been marketed by John Deere and Company as a telescoping "ROLL-GARD" mounted on their Model 2855N Orchard and Vineyard tractors. This telescoping "ROLL-GARD" structure collapses from an up position to a down position in which the cross member is positioned generally lower than the operator. However, when the tractor is no longer being utilized in an orchard environment, the ROPS can be returned to the up position to provide the proper rollover protection. This telescoping ROPS utilizes a fastener to retain the ROPS in the up and down positions, but, otherwise, this fastener becomes a loose piece of hardware when the ROPS is in the down position. Furthermore, this particular telescoping ROPS requires the operator to bear the weight of the movable protective member when moving the ROPS to either the up or the down positions.

SUMMARY OF THE INVENTION

It is an object of this invention to overcome the aforementioned disadvantages of the prior art telescoping rollover protective structure for use with orchard tractors.

It is another object of this invention to provide a releasable locking mechanism to restrain the protective member in a selected position while remaining attached to the support frame.

It is a feature of this invention that the releasable locking mechanism permits the passage of a counterbalancing apparatus through the internal opening of the protective member leg with which the locking mechanism is engaged.

It is an advantage that the releasable locking mechanism is not detachable from the telescopic rollover protective structure.

It is another feature of this invention that the engagement of the releasable locking means with the protective member when in the raised position retains integrity of the ROPS structure when the tractor is rolled over.

It is still another feature of this invention that the releasable locking mechanism includes an adjustable link to ensure proper engagement of the locking mechanism with the protective member when in the raised position.

It is still another object of this invention to provide a counterbalancing mechanism cooperatively associated with the telescopic rollover protective structure to facilitate the raising and lowering of the protective member between raised and lowered positions.

It is yet another feature of this invention that the counterbalance mechanism utilizes a compression spring concentrically mounted on a telescopic rod and positioned within each hollow protective member leg.

It is another advantage of this invention that the operator does not have to bear the full weight of the protective member when moving the protective member between raised and lowered positions.

It is a further feature of this invention that the counterbalance mechanism is operable to support substantially the entire weight of the protective member.

It is yet another advantage of this invention that the counterbalance mechanism is contained substantially within the structure of the telescopic ROPS.

It is a further object of this invention to provide a telescopic rollover protective structure for use with an orchard tractor which is durable in construction, inexpensive of manufacture, carefree of maintenance, facile in assemblage, and simple and effective in use.

These and other objects, features and advantages are accomplished according to the instant invention by providing a telescopic rollover protective structure for use with an orchard tractor wherein the protective member is operatively engaged with a counterbalancing spring to offset the weight thereof and to facilitate the movement of the protective structure between raised and lowered positions. A locking mechanism is connected to the mounting frame and is engageable with the movable protective member to restrict movement thereof when the locking mechanism is engaged therewith. The counterbalancing system includes a compression spring concentrically mounted on a telescopic rod housed within the hollow protective member legs.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a partial cross-sectional view of an orchard tractor to depict an elevational view of the telescopic rollover protective structure mounted on the rear axle of the orchard tractor;

FIG. 2 is a rear elevational view of the telescopic rollover protective system mounted on an orchard tractor with the protective member being shown in a raised position;

FIG. 3 is a partial cross-sectional view similar to that of FIG. 1 showing the telescopic rollover protective system with the protective member being lowered below the top of the operator's seat;

FIG. 4 is a rear elevational view of the tractor and rollover protective system shown in FIG. 3 with the protective member lowered;

FIG. 7 is an enlarged cross-sectional view taken along lines 7—7 of FIG. 6 to provide a detailed view of the releasable locking means engageable with the protective member to restrain movement thereof;

FIG. 8 is a partial rear elevational view of a portion of the cross-member of the rollover protective structure shown in FIGS. 1 and 2 depicting the inclusion of a laterally telescopic wing member protruding therefrom; and FIG. 9 is a partial rear elevational view of the rollover protective structure in FIG. 8 with the wing member retracted into the cross-member, the extended position being shown in phantom.

DETAILED DESCRIPTION OF THE PREFERRED EMBODIMENT

Figure 5:
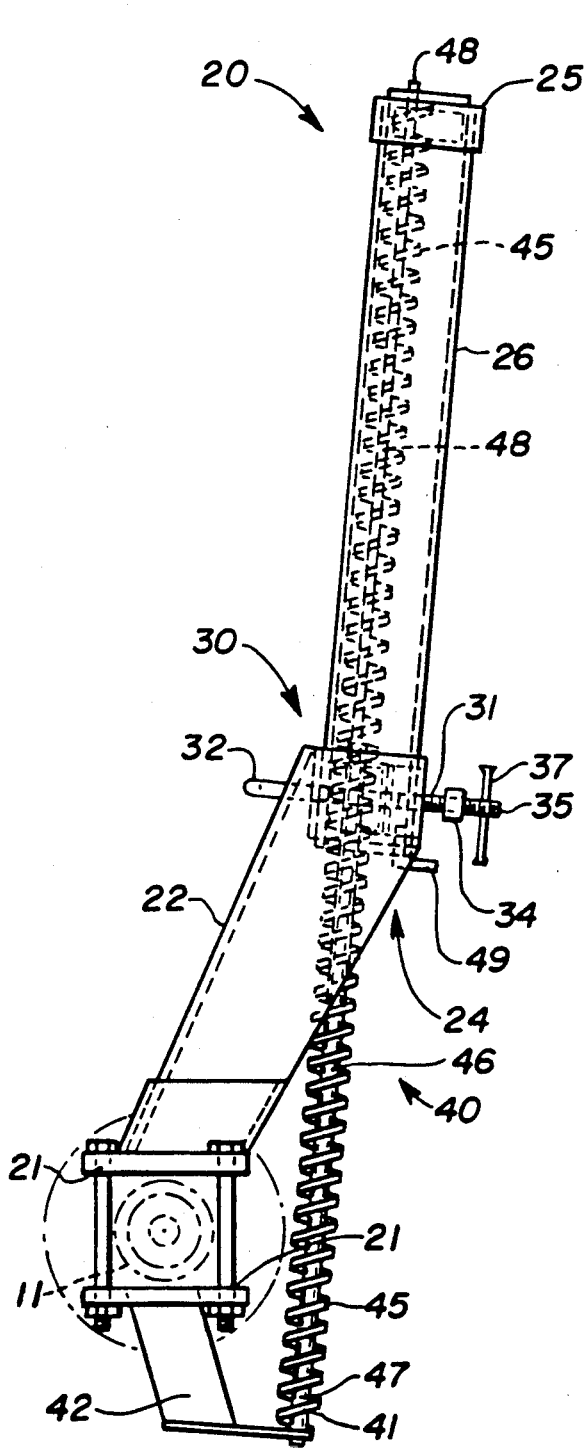
FIG. 5 is an enlarged side elevational view of the telescopic rollover protective structure with the protective member in the raised position.

Referring now to the drawings and, particularly to FIGS. 1-4, the general structure of an orchard tractor having a telescopic rollover protective structure mounted thereto can best be seen. Any left and right references are used as a matter of convenience and are determined by standing at the rear of the tractor 10 facing the forward end, the direction of travel. The tractor 10 is supported above the ground G by a conventional front axle rotatably supporting wheels (not shown) and a conventional rear axle 11 rotatably supporting a pair of rear wheels 12 drivingly coupled in a known manner to a transmission 14 transferring operable power from a standard engine (not shown). The orchard tractor 10 is also provided with an operator's seat 15 and operative controls 16 for supporting the operator on the tractor 10 and controlling the operation thereof.

A rollover protective structure 20, commonly referred to as a ROPS, is detachably connected to the rear axle 11 by laterally spaced fastening apparatus 21 fixing the ROPS 20 to the tractor 10. A pair of generally upright, laterally spaced support members 22 extend upwardly from the rear axle 11 and are joined by a laterally extending cross beam 23 providing structural rigidity therefor. Each vertically extending support member 22 defines a generally vertically oriented opening 24 which receives the protective member 25 for generally vertical sliding movement relative thereto. The protective member 25 is constructed in an inverted U-shaped configuration having generally vertically extending legs 26 interconnected at the upper portion thereof by a laterally extending cross member 27 forming the bight of the inverted U-shaped protective member 25.

Figure 6:
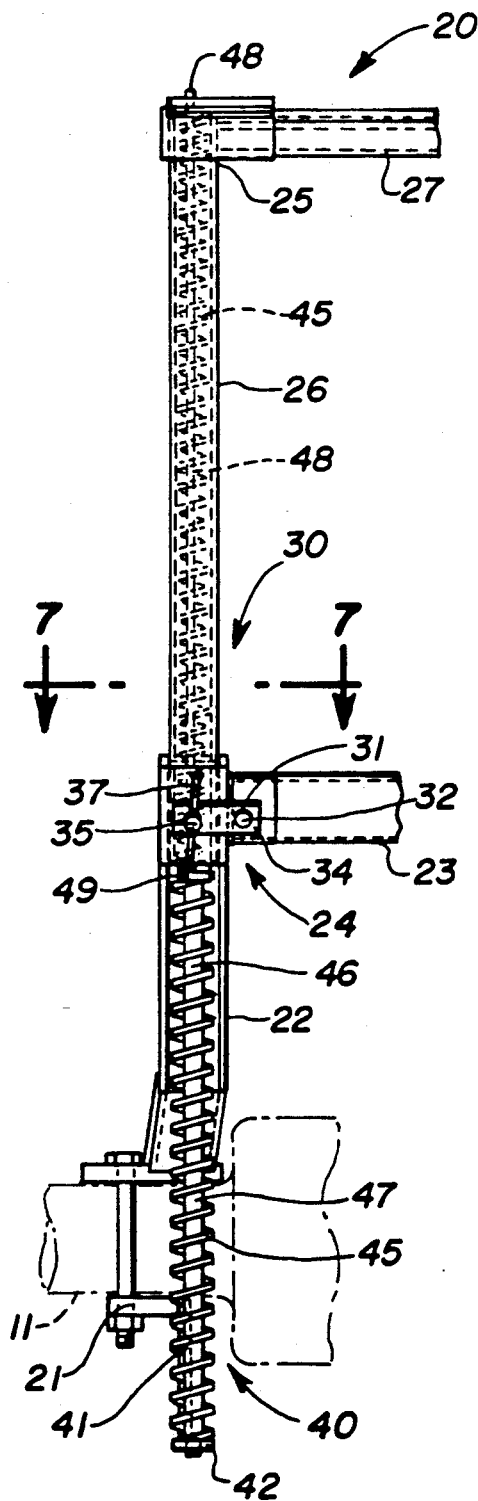
FIG. 6 is an enlarged partial rear elevational view of the rollover protective structure with the protective member in the raised position, the left side of the structure being shown.

As best seen in FIGS. 5-7, the ROPS 20 further includes a releasable locking mechanism 30 which is attached to each of the support members 22 and can be manipulated to engage the corresponding legs 26 of the protective member 25 to restrain the movement thereof relative to the support members 22. Each locking mechanism 30 includes a clamping apparatus 31 which is received through the cross beam 23. The clamping apparatus 31 is constructed with a hook member 32 having a necked-down portion 33 forming one end thereof and being engageable with an opening in the corresponding leg 26 of the protective member 25 and an adjustment link 34 threaded onto and translatable along an opposing threaded end 39 of the hook member 32 for purposes described in greater detail below. A compression spring 38 is concentrically mounted on the threaded end 39 of the hook member 32 and compressed between the adjustment link 34 and the cross beam 23 to bias the hook member 32 into engagement with the protective member leg 26.

The releasable locking mechanism 30 also includes a threaded member 35 threadably received through the adjustment link 34 and engageable with the opposing side of the corresponding leg 26 of the protective member 25 from the hook member 32. Like the hook member 32, the threaded member 35 is provided with a necked-down portion 36 to engage a corresponding opening in the protective member leg 26. The threaded member 35 is also provided with an actuation lever 37 to facilitate the rotation of the threaded member 35, as will be described in greater detail below.

Referring now to FIGS. 1-6, it can be seen that the telescopic ROPS is provided with a counterbalance mechanism operatively associated with both protective members legs 26. The details of the counterbalance mechanism 40 is best seen in FIGS. 5 and 6, in which the left side of the ROPS 20 is depicted, although one skilled in the art will readily realize that the description of the counterbalance mechanism 40 associated with the left transverse leg 26 is equally applicable to the opposing right transverse leg 26.

Referring now to FIGS. 5 and 6, it can be seen that the counterbalance mechanism 40 includes a compression biasing means 41 associated with each respective protective member leg 26. The compression biasing means 41 includes a compression spring 45 seated against a pedestal 42 affixed to the corresponding support member 22 and positioned below the rear axle 11 to provide adequate room for the generally vertical movement of the protective member 25. The compression spring 45 is concentrically mounted around a telescopic rod 46 having a base portion 47 connected to the pedestal 42 and an upwardly extensible portion 48 connected to the protective member leg 26. The purpose of the telescopic rod 46 is to limit lateral movement of the compression spring 45 during movement of the protective member 25. The compression biasing means 41 is generally housed internally of the protective member leg 26, except that the base portion 47 of the telescopic rod 46 and the corresponding portion of the extended compression spring 45 is exposed below the protective member leg 26 when the protective member 25 is raised to a raised position, as depicted in FIGS. 1, 2, 5 and 6.

Referring now to FIGS. 1-4, it can be seen that the ROPS 20 is positionable between an upper raised position, shown in FIGS. 1 and 2 and a lower, retracted position depicted in FIGS. 3 and 4. In the lowered position, the cross member 27 of the protective member 25 is lowered to a position below the operator's seat 15 and immediately above the cross beam 23 of the support frame 22. In this lowered position, the protective member 25 will not typically interfere with low hanging branches, such as found in an orchard, since the cross member 27 is positioned lower than the body of the operator.

It can be seen that the pedestal 42 is positioned such that the protective member leg 26 can be fully accommodated in this lowered position, with the compression spring 45 fully compressed and housed within the internal hollow chamber of the leg 26. Preferably, the counterbalance mechanism 40 will offset at least most of the weight of the protective member 25 when the ROPS 20 is lowered into the retracted position. However, it would be preferable if the size of the compression spring 45 would be such that the weight of the protective member 2 will effect some compression of the spring 45 when the releasable locking mechanisms 35 is loosened to permit a retraction of the protective member 25.

The operation of the telescopic ROPS 20 will be described in conjunction with FIGS. 1–4. Starting with the ROPS 20 in a raised position, as shown in FIGS. 1 and 2, the operator may effect a lowering of the protective member 25 by first loosening or disengaging the releasable locking mechanisms 30 interengaging the support members 22 and the protective member legs 26. As best shown in FIG. 7, a rotation of the threaded member 35, facilitated by engagement of the actuation lever 37, withdraws the necked-down portion 36 of the threaded member 35 from engagement with the protective member leg 26. The hook member 32 is dislodged from the opposing side of the protective member leg 26 by effecting a manual compression of the compression spring 38 by pressing against the adjustment link 34 so that the necked-down portion 33 completely disengages the corresponding leg 26.

When the clamping apparatus 31 has been disengaged from both sides of the ROPS 20, the protective member 25 should drop slightly, compressing the compression spring 45 until the force of the compression spring 45 completely offsets the weight of the protective member 25. Since the protective member 25 moves slightly when the clamping member 31 disengages the legs 26, a release of the manual pressure placed on the adjustment links 34 will not cause a re-engagement of the hook members 32 with the corresponding legs 26 because of the resultant misalignment of the necked-down portions 33 with the corresponding opening in the legs 26. The operator then must manually grab the protective member 25 to effect a retraction of the legs 26 into the corresponding support members 22, which as shown in FIGS. 2 and 4 have an open design to permit the passage of the legs 26 toward the corresponding pedestals 42. Once the protective member 25 has been fully retracted into the support members 22, the clamping apparatus 31 can be re-engaged with the protective member 25 to retain the protective member 25 in its retracted position, as depicted in FIGS. 3 and 4.

Referring again to FIG. 7, the operation of the releasable locking mechanism 30 can best be seen. To effect a disengagement of the clamping apparatus 31 from the protective member 25, the threaded member 35 must be rotated to effect a withdrawal of the necked-down portion 36 from the corresponding protective member leg 26 and the compression spring 38 must be overcome to retract the necked-down portion 33 of the hook member 32 as is described above. Beginning then with both the threaded member 35 and the hook member 32 being disengaged from the corresponding protective member legs 26, the clamping apparatus 31 can be reengaged therewith by the biasing force exerted by the compression spring 38 urging the necked-down portion 33 into an appropriately positioned hole in the corresponding protective member leg 26 to temporarily fix the protective member 25 against the support members 22.

The body of the hook member 32 immediately adjacent the necked-down portion 33, forming a shoulder, rests against a support plate 29 fixed on the inside of each support member 22 to stop the movement of the hook member 32 as urged by the compression spring 38. A rotation of the threaded member 35 to move the threaded member 35 into engagement with the corresponding protective member leg 26 causes the necked-down portion 36 to pass into another properly positioned hole in the leg 26 until the body of the threaded member 35, forming a shoulder adjacent the necked-down portion 36, rests against the leg 26.

Further rotation of the threaded member 35 forces the leg 26 against the inner support plate 29 and locks the protective member 25 against the support members 22. During this rotational movement of the threaded member 35, the threaded member 35 translates through the adjustment link 34, moving relative thereto. The engagement of the releasable locking mechanism 30 with the protective member 25 when the protective member 25 is in its raised position must be sufficient to withstand the weight of the tractor 10 if it rolls over onto the ROPS 20 without permitting the protective member 25 to collapse into the support members 22.

To return the protective member 25 into its raised position, thereby re-instituting the rollover protection for the operator, the operator must first disengage the releasable locking mechanisms 30, as described above, and raise the protective member 25 into its fully extended raised position, whereupon the clamping apparatus 31 is reengaged with the protective member legs 26 to fix the protective member 25 in its raised position. One skilled in the art will readily realize that the biasing force of the compression springs 45 housed within the protective member legs 26 assist the raising of the protective member 25. To prevent the complete retraction of the protective member 25 from the support members 22, an outwardly protruding tab 49 is affixed to the bottom of each respective protective member leg 26 to engage the corresponding support member 22 when the protective member 25 is positioned at or above the fully raised position.

One skilled in the art will readily realize that the provision of the adjustment link 34 threaded onto the end 39 of the hook member 32 and threadably receiving the member 35 for translational movement relative thereto, permits the adjustment of the relative positional relationship between the hook member 32 and the threaded member 35 and of the amount of pre-compression of the compression spring 38 to permit a proper engagement of the protective member legs 26. This adjustment can be effected by a rotation of the adjustment link 34 along the threaded end 39 in the direction required. A jam nut 53 threaded onto the end 39 of the hook member 32 can be used to help fix the adjustment link 34 into the selected position.

In some orchard tractor models, the wheel spacing between the opposing rear wheels 12 is so narrow that the positioning of a telescopic ROPS 20 internally of the rear wheels 12, as depicted in FIGS. 1 - 4 does not provide adequate rollover protection for the operator. In such cases, the hollow cross member 27 can house laterally extensible wing members 51, which must be completely retractable into the body of the cross member 27 when the protective member 25 is lowered into the retracted position, shown in FIGS. 3 and 4, because of the restricted spacing between the rear wheels 12. To fix the laterally shiftable wings 51 into either an extended or retracted positions, shown in FIGS. 8 and 9, a latching mechanism 52 can be provided to interengage the cross member 27 and the extendable wing 51. One skilled in the art will readily realize that the positioning of the latching mechanism 52 need only be convenient to the operator while permitting a selective interengagement between the cross member 27 and the wings 51.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A rollover protective structure for a tractor having forward and rearward axles rotatably mounting wheels for mobilely supporting said tractor over the ground, comprising:

mounting means for connection of said rollover protective structure to said tractor, said mounting means including a pair of generally vertically extending support members defining generally vertically oriented openings;

a protective member including a pair of spaced apart legs interconnected at respective upper ends thereof by a cross member, each said leg being received within the opening of a corresponding said support member to permit a generally vertical movement of said protective member relative to said mounting means;

a counterbalance mechanism operatively offsetting the weight of said protective member irrespective of the position thereof relative to said mounting means to facilitate the generally vertical movement of said protective member, said counterbalance mechanism including a compression spring concentrically mounted on a telescopic rod received within each said protective member leg, said compression springs being operable to exert a force urging said protective member upwardly at least equal to the weight of said protective member; and releasable locking means attached to each said support member and engageable with said protective member from opposing sides thereof for positionally fixing said protective member relative to said mounting means, so that the vertical position of said cross member relative to said mounting means can be selectively varied.

2. The rollover protective structure of claim 1 wherein said releasable locking means includes actuating means selectively manipulatable to effect a selective engagement and disengagement of said locking means with said protective member.

3. The rollover protective structure of claim 2 wherein said actuating means includes a threaded member which is rotatable in opposing directions for effecting engagement and disengagement of said protective member.

4. The rollover protective structure of claim 3 wherein said locking means further includes a clamping apparatus engageable with said protective member from one side thereof and extending toward an opposing side of said protective member to threadably receive said threaded member, which is engageable with said protective member from said opposing side.

5. The rollover protective structure of claim 4 wherein said clamping apparatus includes a hook member and an adjustment link selectively positionably mounted thereon, said adjustment link threadably receiving said threaded member, the positional movement of said adjustment link relative to said hook member permitting an adjustment of the clamping engagement of said locking means with said protective member.

6. The rollover protective structure of claim 5 wherein said threaded member and said hook member engage holes in the respective sides of said protective member legs, said protective member legs having a plurality of pairs of opposing holes corresponding to the selectable positions desired for said protective member.

7. In a rollover protective structure for a tractor having a frame member detachably affixed to said tractor, a protective member telescopically received within said frame member and movable generally vertically relative thereto, and a locking means interengageable with said frame member and said protective member for selectively positionably fixing the telescopic movement of said protective member relative to said frame member, said protective member having a pair of generally vertically extending legs telescopically received within said frame member, the improvement comprising:

a counterbalance mechanism disposed between said frame member and said protective member to offset the weight of said protective member and facilitate the telescopic movement of said protective member relative to said frame member, said counterbalance mechanism including a compression spring concentrically mounted on a telescopic rod received within each said protective member leg and supported for compression against a pedestal connected to each said telescopic rod, said compression springs being engageable with each said protective member leg such that said compression springs are operable to exert a force urging said protective member upwardly at least equal to the weight of said protective member as said protective member is moved downwardly.

8. A rollover protective structure for a tractor comprising:

a mounting frame for detachably connecting said rollover protective structure to said tractor, said mounting frame including a pair of generally vertically extending support members defining generally vertically oriented openings;

a protective member including a pair of spaced apart legs interconnected at respective upper ends thereof by a cross member, each said leg being received within the opening of a corresponding said support member to permit a generally vertical movement of said protective member relative to said mounting means;

releasable locking means attached to each said support member and engageable with said protective member for positionally fixing said protective member relative to said mounting means, so that the vertical position of said cross member relative to said mounting means can be selectively varied, said releasable locking means including a clamping apparatus engageable with each respective said protective member leg from one side thereof and a threaded member engageable with said respective protective member leg from an opposing side thereof and being threadably received by said clamping apparatus for rotation in opposing directions to effect selective engagement and disengagement of said locking means with said protective member; and a counterbalance mechanism disposed between said mounting frame and said protective member to offset the weight of said protective member and facilitate the telescopic movement of said protective member relative to said mounting frame.

9. The rollover protective structure of claim 8 wherein said clamping apparatus includes a hook member and an adjustment link selectively positionably mounted thereon, said adjustment link threadably receiving said threaded member, the positional movement of said adjustment link relative to said hook member permitting an adjustment of the clamping engagement of said locking means with said protective member.

10. The rollover protective structure of claim 9 wherein said threaded member and said hook member engage holes in the respective sides of said protective member legs, said protective member legs having a plurality of pairs of opposing holes corresponding to the selectable positions desired for said protective member.

11. The rollover protective structure of claim 10 wherein said counterbalance mechanism includes compression biasing means supported from a pedestal affixed to said frame member and engaged with said protective member such that a downward movement of said protective member effects a compressing of said biasing means.

12. The rollover protective structure of claim 11 wherein said compression biasing means includes a compression spring concentrically mounted on a telescopic rod received within each said protective member leg and being engageable with each said protective member leg such that said compression springs are operable to exert a force urging said protective member upwardly at least equal to the weight of said protective member as said protective member is moved downwardly.

13. The rollover protective structure of claim 12 wherein said protective member further includes wings telescopically extendable from said cross member to extend laterally therefrom and latching means cooperable therewith to fix said wings in a retracted position within said cross member or in an extended position to extend laterally therefrom and effectively increase the lateral width of said cross member.

* * * * *